(12) United States Patent
Goeller et al.

(10) Patent No.: US 11,577,698 B2
(45) Date of Patent: Feb. 14, 2023

(54) WIPER ARM DEVICE, WIPER ARM, AND SCREEN WIPER SYSTEM

(71) Applicant: Robert Bosch GmbH, Stuttgart (DE)

(72) Inventors: Alexander Goeller, Baiersbronn (DE); Andreas Biank, Oberlauterbach (FR); Salvatore Formisano, Malsch (DE); Swen Koehn, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/904,736

(22) Filed: Jun. 18, 2020

(65) Prior Publication Data

US 2020/0398793 A1 Dec. 24, 2020

(30) Foreign Application Priority Data

Jun. 18, 2019 (DE) .......................... 102019208809.0

(51) Int. Cl.
*B60S 1/34* (2006.01)
(52) U.S. Cl.
CPC ........... *B60S 1/3415* (2013.01); *B60S 1/3495* (2013.01)
(58) Field of Classification Search
CPC .. B60S 1/48; B60S 1/04; B60S 1/3415; B60S 1/34; B60S 1/522; B60S 1/38; B60S 1/52; B60S 1/3495

USPC .......................... 15/250.001, 250.33, 250.32
See application file for complete search history.

(56) References Cited

U.S. PATENT DOCUMENTS

| 5,349,719 A | 9/1994 | Egner-Walter |
| 5,398,370 A | 3/1995 | Gomer et al. |
| 6,094,772 A | 8/2000 | West |
| 2002/0133893 A1 | 9/2002 | Hasegawa et al. |
| 2016/0121853 A1* | 5/2016 | Uchiyama ............. B60S 1/3468 15/250.04 |
| 2017/0197590 A1* | 7/2017 | Caillot .................. B60S 1/3484 |
| 2018/0118171 A1* | 5/2018 | Shimoyama .............. B60S 1/04 |

FOREIGN PATENT DOCUMENTS

| EP | 2684749 A1 | 1/2013 |
| EP | 3138746 A1 | 3/2017 |
| FR | 2746750 A1 | 10/1997 |

* cited by examiner

*Primary Examiner* — Katina N. Henson
(74) *Attorney, Agent, or Firm* — Michael Best & Friedrich LLP

(57) ABSTRACT

A wiper arm device for a wiper arm (20), having at least one fastening part (44) which is provided for connecting at least one articulation part (38) of the wiper arm (20) to a drive shaft (24) of a wiper drive (16), wherein the fastening part (44) has at least one fastening boss (46) for fastening the fastening part (44) to the drive shaft (24) and at least one articulation boss (48) for fastening the articulation part (38) to the fastening part (44).

12 Claims, 5 Drawing Sheets

WIPER ARM DEVICE, WIPER ARM, AND SCREEN WIPER SYSTEM

BACKGROUND OF THE INVENTION

A wiper arm device for a wiper arm, having at least one fastening part which is provided for connecting at least one articulation part of the wiper arm to a drive shaft of a wiper drive has already been proposed, wherein the fastening part has at least one fastening boss for fastening the fastening part to the drive shaft and at least one articulation boss for fastening the articulation part to the fastening part.

SUMMARY OF THE INVENTION

The invention proceeds from a wiper arm device for a wiper arm, having at least one fastening part which is provided for connecting at least one articulation part of the wiper arm to a drive shaft of a wiper drive, wherein the fastening part has at least one fastening boss for fastening the fastening part to the drive shaft and at least one articulation boss for fastening the articulation part of the fastening part.

It is proposed that the fastening part, in particular along an axis of main extent of the fasting part, has at least one line receptacle which is provided for at least partially receiving at least one line unit of the wiper arm.

The wiper arm device is preferably configured as part of the wiper arm. The wiper arm is preferably part of a screen wiper system. The screen wiper system is preferably provided for cleaning a screen, such as for example of a building or a vehicle. The wiper drive is preferably configured as part of the screen wiper system. The wiper arm is preferably provided for connecting a wiper blade of the screen wiper system to the wiper drive, wherein the wiper drive, in particular an electric motor of the wiper drive, is in particular disposed so as to be stationary relative to the screen. The wiper arm device is particularly preferably provided for connecting in a rotationally fixed manner the wiper arm to the wiper drive. The drive shaft is preferably provided for moving the wiper arm relative to the screen, in particular about a drive axis of the drive shaft. In particular, the drive shaft, in particular the drive axis, is configured so as to be at least substantially perpendicular to an axis of main extent of the wiper arm and/or of the screen. The wiper arm by way of the fasting part, in particular the fastening boss, and the drive shaft, is preferably fastened, in particular in a rotationally fixed manner, to the wiper drive. "At least substantially perpendicular" is in particular to be understood as an alignment of a direction relative to a reference direction, wherein the direction and the reference direction, in particular when viewed in a projection plane, enclose an angle of 90°, and the angle has a maximum deviation of in particular less than 8°, advantageously less than 5°, and particularly advantageously less than 2°.

The axis of main extent of the fastening part is preferably configured so as to be at least substantially perpendicular to the drive axis of the drive shaft. In particular, the fastening boss and the articulation boss have in each case at least one central axis, wherein the central axis of the articulation boss is in particular aligned along a direction in which the articulation part is connected to the fastening part, and/or the central axis of the fastening boss is aligned along a direction in which the drive shaft is connected to the fastening part. In particular, the fastening part on the fastening boss delimits at least one boss opening, the central axis of the fastening boss running in particular through said boss opening. The fastening part on the articulation boss preferably delimits at least one further boss opening, the central axis of the articulation boss running in particular through said further boss opening. The articulation boss preferably extends at least largely, in particular at least substantially completely, across an entire transverse extent, in particular at least substantially perpendicularly to the axis of main extent, of the fastening part. The central axis/axes of the fastening boss and/or of the articulation boss is/are preferably aligned so as to be at least substantially perpendicular to the axis of main extent of the fastening part. The central axes of the fastening boss and of the articulation boss are preferably aligned so as to be at least substantially mutually perpendicular. The axis of main extent of the fastening part is preferably configured so as to be at least substantially parallel with an axis of main extent of the wiper arm. "At least substantially parallel" is in particular to be understood as an alignment in a direction relative to a reference direction, in particular in a plane, wherein the direction in relation to the reference direction has a deviation of in particular less than 8°, advantageously less than 5°, and particularly advantageously less than 2°. The fastening part is preferably configured at least largely from a metal and/or a plastics material, in particular a hard plastics material. The fastening part, in particular when viewed along the axis of main extent thereof, preferably has a straight or a curved basic shape.

A "line receptacle" is in particular to be understood to be a unit which is provided for holding, for positioning, and/or for fixing the line unit on or in the fastening part. The line receptacle is preferably provided for connecting, in particular in a force-fitting and/or form-fitting manner, the line unit to at least the fastening part, and/or for enabling an at least partial disposal of the line unit on the fastening part and/or within the fastening part. The line receptacle preferably delimits at least one clearance on the fastening part. The line unit particularly preferably delimits a clearance, which when viewed in particular at least substantially perpendicularly to the axis of main extent of the fastening part, is disposed within the fastening part. The line receptacle limiting the clearance, at least when viewed substantially perpendicularly to the axis of main extent of the fastening part, is preferably at least largely, in particular at least substantially completely, enclosed by an external contour of the fastening part. An object being "at least substantially completely enclosed" by another object, in particular when viewed in a projection plane, is in particular to be understood such that the object, when viewed from a center of the object, is surrounded by the other object across an angular range, in particular in the projection plane, to an extent of in particular at least 90%, preferably at least 95%, and particularly preferably 99%. The line receptacle for delimiting the clearance for receiving the line unit, in particular at least when viewed in a plane of the fastening part that extends so as to be at least substantially perpendicular to the axis of main extent of the fastening part, preferably has a U-shaped, rectangular, and/or V-shaped cross section. In particular in one design embodiment of the wiper arm device in which the line receptacle at least partially delimits a clearance on the fastening part, the line receptacle, in particular the clearance delimited by the line receptacle, is at least largely disposed on the fastening part across an entire length of the fastening part, in particular along the axis of main extent of the fastening part. It is conceivable that the line receptacle delimits at least more than one clearance on the fastening part, said clearances being connected to one another or transitioning into one another. It is conceivable that the line receptacle and/or the fastening part are/is configured in such a manner that the axis of main extent of the fastening part is aligned so as to be at least substantially parallel, in particular identical, with an axis of main extent of the line receptacle.

The line unit is preferably at least partially disposed on or in the line receptacle. In particular in one design embodiment of the wiper arm device in which the line receptacle delimits at least one clearance, the line unit is at least partially disposed within the clearance. The line unit is preferably provided for routing at least a fluid, in particular water and/or a cleaning agent, and/or electric and/or electronic signals, in particular from a supply unit of the screen wiper system to the wiper blade. The line unit preferably comprises at least one line element which is configured, for example, as a cable, hose, duct, or the like. The line receptacle is preferably provided for holding the line unit, in particular the line element, on the fastening part at least in a movement of the fastening part, in particular about the drive axis. The line unit, in particular the line element, preferably when viewed in a plane that extends so as to be at least substantially perpendicular to the axis of main extent of the fastening part, is preferably at least partially, in particular at least largely, enclosed by the line receptacle.

On account of the design embodiment of the wiper arm device according to the invention, the line unit can advantageously be guided and/or moved by way of the fastening part. An advantageously compact disposal of the line unit on the wiper arm, in particular the fastening part, can be enabled. An advantageously high degree of protection of the line unit can be enabled, in particular in relation to external influences and/or to damage in a movement of the wiper arm, in particular of the fastening part. An advantageously positive appearance, in particular in a field of view of a user, can be enabled, in particular since line elements of the line unit can be guided so as to be obscured from the user.

It is furthermore proposed that the line receptacle is provided for guiding the line unit, in a state of the line unit being disposed on the line receptacle, in particular when viewed along the axis of main extent of the fastening part, at least from an end region of the fastening part that comprises the articulation boss to an end region of the fastening part that comprises the fastening boss, wherein the line unit is enclosed by the line receptacle and/or the fastening part on at least two sides. The end region of the fastening part that comprises the articulation boss, from a side of the fastening part that is disposed so as to be at least substantially perpendicular to the axis of main extent, extends in particular along the axis of main extent of the fastening part beyond the articulation boss. The end region of the fastening part that comprises the articulation boss, and/or the end region of the fastening part that comprises the fastening boss, along the axis of main extent of the fastening part, are/is preferably configured across a proportion of an entire length of the fastening part of in particular at most 40%, preferably at most 30%, and particularly preferably at most 20%. The end region of the fastening part that comprises the articulation boss, and/or the end region of the fastening part that comprises the fastening boss, along the axis of main extent of the fastening part preferably have/has a length of in particular at most 15 cm, preferably at most 10 cm, and particular preferably at most 5 cm. The line receptacle preferably has at least two conduit openings which are provided for guiding the line unit into or out of the line receptacle and/or the fastening part. The conduit openings, when viewed along the axis of main extent of the fastening part, are preferably at least largely disposed in a region of the fastening part between the articulation boss and the fastening boss. At least one conduit opening of the conduit openings is preferably disposed in the end region of the fastening part that comprises the articulation boss. At least one further conduit opening of the conduit openings is preferably disposed in the end region of the fastening part that comprises the fastening boss. The line unit, in a manner transverse to the axis of main extent of the fastening part, in particular in a region of the fastening part that is configured between the conduit openings, is preferably enclosed by the line receptacle and/or the fastening part on at least two, preferably three, sides. On account of the design embodiment of the wiper arm device according to the invention, an advantageously high degree of protection of the line unit, in particular in relation to external influences and/or to damage in a movement of the wiper arm, can be enabled, in particular since the line unit can at least partially be guided within the fastening part and/or between the end regions can be guided along the fastening part.

It is moreover proposed that the line receptacle at least largely encloses the line unit, wherein the fastening part has at least one service opening which is disposed on at least one side of the line receptacle. The service opening is preferably disposed on a side of the line receptacle that is aligned so as to be at least substantially perpendicular to the central axis of the fastening boss. The service opening on one side of the fastening part and/or on the line receptacle preferably extends along the axis of main extent of the fastening part, at least from the end region that comprises the articulation boss to the end region that comprises the fastening boss. However, it is also conceivable that the service opening on the fastening part and/or the line receptacle is disposed along the axis of main extent, between the end region that comprises the articulation boss and the end region that comprises the fastening boss. The service opening, in particular across an at least substantially entire length of the service opening, particularly preferably extends at least largely across an entire transverse extent of the fastening part and/or of the line receptacle, in particular so as to be at least substantially perpendicular to the axis of main extent of the fastening part. The end regions are preferably delimited by a smallest imaginary cuboid which just completely encloses the fastening part. The service opening is particularly preferably provided for rendering at least one connection element of the line unit that is disposed on or in the line receptacle accessible to a user in particular for maintenance, for assembly, or disassembly of the wiper arm and/or the wiper arm device. On account of the design embodiment of the wiper arm device according to the invention, an advantageously simple maintenance, assembly, or disassembly of the wiper arm and/or of the wiper arm device can be enabled, in particular since the line unit by way of the service opening can be rendered accessible independently of disassembling of the fastening part.

It is furthermore proposed that the line receptacle has at least one conduit opening, in particular one of the previously mentioned conduit openings, which is provided for guiding the line unit out of the fastening part in at least one direction that faces the fastening boss. The conduit opening is preferably disposed in the end region that comprises the fastening boss. The conduit opening is preferably disposed on a side of the fastening part that is aligned so as to be at least substantially perpendicular to the central axis of the fastening boss. The conduit opening from the central axis of the fastening boss particularly preferably has a maximum spacing which is less than 50% of a maximum extent of the fastening part, in particular along the axis of main extent of the fastening part. The conduit opening is preferably disposed in such a manner that the conduit opening from the central axis of the fastening boss has a minimum spacing of in particular at most 10 cm, preferably at most 7 cm, in particular preferably at most 4 cm. On account of the design embodiment of the wiper arm device according to the invention, advantageously direct guiding of the line unit toward the articulation unit can be enabled. An advantageously high degree of protection of the line unit can be achieved.

It is furthermore proposed that the service opening and the conduit opening are disposed on mutually dissimilar sides, in particular sides that face away from one another, of the fastening part and/or the line receptacle. The service opening and the conduit opening, when viewed along the drive axis and/or the central axis of the fastening boss, are preferably disposed so as to be mutually offset. On account of the design embodiment of the wiper arm device according to the invention, an advantageously simple and rapid maintenance, assembly, or disassembly of the wiper arm and/or of the wiper arm device can be enabled, in particular since the line unit by way of the service opening can be rendered accessible independently of disassembling the fastening part. Advantageously direct guiding of the line unit toward the articulation unit can in particular be simultaneously enabled.

It is moreover proposed that the line receptacle comprises at least one force-fit and/or form-fit element which is disposed on the fastening part, in particular an internal side of the fastening part, and is provided for at least partially fixing or holding the line unit on the fastening part. The internal side of the fastening part on which the force-fit and/or form-fit element is disposed is preferably part of the line receptacle and delimits the clearance in which the line unit is able to be disposed. The force-fit and/or form-fit element for fixing or holding the line unit on the fastening part is preferably provided for connecting at least in a partially force-fitting and/or form-fitting manner the line unit to the fastening part. The force-fit and/or form-fit element is preferably configured so as to be integral to the fastening part. The force-fit and/or form-fit element is preferably provided for connecting the line unit at least partially to the fastening part and/or for guiding said line unit on the fastening part. For example, the force-fit and/or form-fit element is configured as a cable clamp, as a hook, as a tie, as a bracket, as an eyelet, as an in particular duct-shaped molded component, or the like. It is conceivable that the force-fit and/or form-fit element is disposed within the clearance on the fastening part. The force-fit and/or form-fit element is in particular provided for fixing the line unit, in particular at least one line element of the line unit, at least partially along at least one axis relative to the fastening part. Alternatively or additionally, it is conceivable that the force-fit and/or form-fit element is provided for at least partially reducing, in particular constricting, a transverse extent of a clearance delimited by the line receptacle in comparison to a maximum transverse extent of the clearance, said transverse extent being in particular aligned so as to be at least substantially perpendicular to the axis of main extent of the fastening part, wherein the line unit on account of a flexural stiffness of the line element is in particular connected in a force-fitting and/or form-fitting manner to the fastening part. The force-fit and/or form-fit element, in particular at least when viewed in a plane of the fastening part that extends so as to be at least substantially perpendicular to the drive axis, is preferably disposed on the service opening and/or the conduit opening and the fastening part. It is conceivable that the line receptacle comprises more than one force-fit and/or form-fit element, wherein the line unit, in particular the line element, is in particular fixed within the clearance and/or on the fastening part, in particular in a region of the service opening, by way of the two force-fit and/or form-fit elements. On account of the design embodiment of the wiper arm device according to the invention, advantageously reliable and compact guiding of the line unit on and/or through the line receptacle can be enabled. Twisting or tilting of line elements in a movement of the wiper arm and/or of the fastening part can advantageously be prevented. An advantageously simple and rapid assembly and disassembly of the wiper arm and/or of the fastening part can be enabled, in particular since the line unit, preferably the connection element of the line unit, can be fixed relative to the service opening and/or to the line receptacle that delimits the clearance.

Moreover proposed is a wiper arm, in particular the previously mentioned wiper arm, having at least one, in particular the previously mentioned, articulation part, having at least one, in particular the previously mentioned, line unit, and having at least one, in particular the previously mentioned, wiper arm device according to the invention. The wiper arm preferably has at least one wiper rod which is disposed on the articulation part. The wiper rod is preferably disposed on an end of the articulation part that faces away from the fastening part and is in particular connected in a force-fitting and form-fitting manner to the articulation part. The wiper arm preferably comprises at least one wiper arm adapter which is provided for fastening the wiper arm, in particular the wiper rod, to the wiper blade, in particular a wiper blade adapter of the wiper blade. The wiper blade, at least in a state disposed on the wiper arm, is preferably mounted so as to be movable, in particular rotatable, on the wiper arm. On account of the design embodiment of the wiper arm according to the invention an advantageously compact disposal can be enabled. An advantageously high degree of protection of the line unit can be enabled, in particular in relation to external influences and/or to damage in a movement of the wiper arm. An advantageously positive appearance, in particular in a field of view of a user, can be enabled, in particular since line elements of the line unit can be guided so as to be invisible to the user.

It is furthermore proposed that the line unit has at least two line elements and at least one, in particular the previously mentioned, connection element for connecting in a releasable manner the two line elements, wherein at least the connection element is disposed within the line receptacle, in particular in a region of a, preferably the previously mentioned, service opening of the fastening part. The connection element preferably comprises at least two connector regions which are provided for fastening in a releasable manner, in particular in a form-fitting and/or force-fitting manner, in each case one of the line elements, to the connection element. The connection element at the connector regions is preferably configured so as to correspond to at least one end of one of the line elements. The connection element is preferably provided for connecting electric and/or optical lines, fluid lines, and/or gas lines. For example, the connection element is at least partially configured as a plug connector, a pipe connector, a hose connector, or the like. The line elements are in particular fastened to the connection element by way of a screw connection, a bayonet mount, a plug connection, a vacuum, or the like. It is conceivable that the line unit comprises at least one sealing element which is in particular disposed on the connection element or between the connection element and at least one of the line elements. The connection element, in particular at least in an assembled state of the wiper arm, when viewed at least substantially perpendicularly to the axis of main extent of the fastening part, is particularly preferably disposed within the line receptacle, in particular the service opening. The force-fit and/or form-fit element of the wiper arm device is preferably disposed on a line element of the line unit that is connected to the connection unit, and is in particular provided for holding and/or fixing at least the line element and/or the connection element. On account of the design embodiment of the wiper arm according to the invention, an advantageously simple and rapid maintenance, assembly, or disassembly of the wiper arm can be enabled, in particular since an advantageously high degree of accessibility of the line elements for removing or attaching the wiper arm to the wiper drive can be achieved for a user by way of the connection element disposed in the line receptacle.

It is moreover proposed that the wiper arm has at least one cover cap which at least in a closed state is provided for at least substantially completely covering a service opening of the line receptacle. The cover cap by way of an articulation bolt mounted in the articulation boss is preferably mounted so as to be movable, in particular rotatable, relative to the fastening part and the articulation part. The cover cap in the closed state preferably at least partially, in particular at least largely, encloses the fastening part. It is conceivable that the cover cap in the closed state bears at least partially on the fastening part. The cover cap in the closed state, when viewed along the central axis of the fastening boss, encloses in particular at least substantially completely the fastening part. The cover cap preferably at least substantially completely covers at least one opening, in particular for fastening the drive shaft, on the fastening boss on at least one side of the fastening part. The cover cap is in particular at least partially, in particular at least largely, configured from a metal and/or a plastics material, in particular a hard plastics material. It is conceivable that the wiper arm comprises at least one sealing element which is in particular disposed on the cover cap. The sealing element is preferably provided for closing in an at least substantially water-tight and/or air-tight manner the service opening of the line receptacle in the closed state, in particular on a side of the fastening part that is covered by the cover cap. On account of the design embodiment of the wiper arm according to the invention, an advantageously high degree of protection of the line unit in relation to damage by external influences, such as for example water, corrosion, heat or cold, can be enabled, in particularly independently of any impediment of a functionality of the wiper arm device, in particular in terms of the service opening.

Moreover proposed is a screen wiper system having at least one wiper blade, having at least one wiper drive, having at least one wiper arm according to the invention, and having at least one supply unit, in particular a fluid container and/or an electronics unit, which by way of the line unit of the wiper arm is provided for supplying the wiper blade with a fluid and/or an electric voltage. In particular in a design embodiment of the screen wiper system in which the supply unit is at least partially configured as a fluid container, the screen wiper system has at least one pump unit which is provided for conveying the fluid from the supply unit through the line unit to the wiper arm and/or the wiper blade. For example, the electronics unit has at least one electronic element which is configured as a transformer, as a battery, and/or as a generator. In particular in a design embodiment of the screen wiper system as part of a vehicle, it is conceivable that the electronics unit comprises a vehicle battery and/or is configured as part of a control circuit of the vehicle. The screen wiper system preferably has at least one heating unit which is provided for heating at least one line element of the line unit. The heating unit is preferably provided for at least substantially preventing the fluid guided through the line element from freezing. The heating unit preferably has at least one heating element which is in particular disposed on the line element. The heating element is preferably disposed in or on the wiper arm or the wiper blade. At least one further line element of the line unit that is configured as a cable and/or as an electronics connection is particularly preferably provided for supplying the heating element with voltage, in particular by means of the electronics unit. It is conceivable that the screen wiper system has at least more than one, in particular exactly two, wiper arms, wherein the wiper drive has at least more than one, in particular exactly two, drive shafts. The two drive shafts are preferably disposed so as to be at least substantially mutually parallel. The wiper arms are preferably provided for cleaning the screen or at least more than one screen. On account of the design embodiment of the screen wiper system according to the invention, an advantageously compact disposal can be enabled. An advantageously high degree of protection of the line unit can be enabled, in particular in relation to external influences and/or to damage in a movement of the wiper arm about the drive shaft. An advantageously positive appearance, in particular in a field of view of a user, can be enabled, in particular since line elements of the line unit can be guided so as to be invisible to the user.

It is furthermore proposed that the screen wiper system has at least one bearing and/or guiding unit which in a movement of the fastening part about a central axis of the fastening boss is provided for bearing the line unit so as to be at least partially movable about the central axis and/or, proceeding from the fastening part, for guiding the line unit at least partially along and/or about the drive shaft. The bearing and/or guiding unit is preferably disposed on the wiper drive, in particular the drive shaft. The bearing and/or guiding unit preferably has at least one bearing element which is in particular configured so as to be movable, preferably rotatable, about the central axis and/or the drive shaft. The bearing element, in particular in a movement of the fastening part about the central axis of the fastening boss, is in particular provided for bearing at least one line element of the line unit so as to be at least partially movable about the central axis. The bearing element, when viewed in a plane extending so as to be at least substantially perpendicular to the drive axis, preferably at least largely, in particular at least substantially completely, encloses the drive shaft. For example, the bearing element is at least partially configured as a bearing plate or as a ball bearing. The bearing and/or guiding unit preferably comprises at least one guiding element that, proceeding from the fastening part, is provided for guiding the at least one line element of the line unit at least partially along and/or about the drive shaft. It is conceivable that the guiding element is configured as a molded component which in particular at least substantially completely encloses the drive shaft at least partially along the drive axis. The guiding element is preferably configured in such a manner that at least one region of the guiding element is configured so as to correspond to the line element of the line unit that is in particular guided along the drive shaft by the guiding element. Alternatively or additionally, it is conceivable that the guiding element is configured in such a manner that at least one connection region of the drive shaft is at least substantially completely covered. In particular, the connection region along the drive axis extends from a region of the drive shaft that is enclosed by the fastening part up to a region of the drive shaft in which the line unit, in particular the line element, is disposed so as to be at least substantially spaced apart from the wiper drive, in particular the drive shaft. The bearing and/or guiding unit preferably comprises at least one holding element which is provided for holding, in particular in a force-fitting and/or form-fitting manner, the line element on the bearing element and/or the guiding element. It is conceivable that the line unit has more than one line element, said line elements running in particular through the bearing and/or guiding unit, wherein the bearing and/or guiding unit, in particular the guiding element and/or the holding element, in a movement of the wiper arm, in particular of the fastening part, about the drive shaft, are/is preferably provided for preventing any twisting and/or entangling of the line elements. On account of the design embodiment of the screen wiper system according to the invention, advantageously direct guiding of the line unit on the drive shaft can be enabled. An advantageously high degree of protection in relation to damage to the line elements, in particular on account of twisting and/or abrading, can be enabled. An advantageously compact disposal of the screen wiper system can be achieved.

The wiper arm device according to the invention, the wiper arm according to the invention, and/or the screen wiper system according to the invention herein are/is not to be limited to the application and embodiment described above. In particular, the wiper arm device according to the invention, the wiper arm according to the invention, and/or the screen wiper system according to the invention for fulfilling a functional mode described herein may have a number of individual elements, components, and units that deviates from the number mentioned herein. Moreover, in terms of the ranges of values stated in this disclosure, values lying within the mentioned limits are also to be considered disclosed and usable in an arbitrary manner.

BRIEF DESCRIPTION OF THE DRAWINGS

Further advantages are derived from the description of the drawing hereunder. An exemplary embodiment of the invention is illustrated in the drawing. The drawing, the description, and the claims include numerous features in combination. The person skilled in the art will expediently also consider the features individually and combine said features so as to form expedient further combinations.

In the drawing.

DETAILED DESCRIPTION

Figure 1:
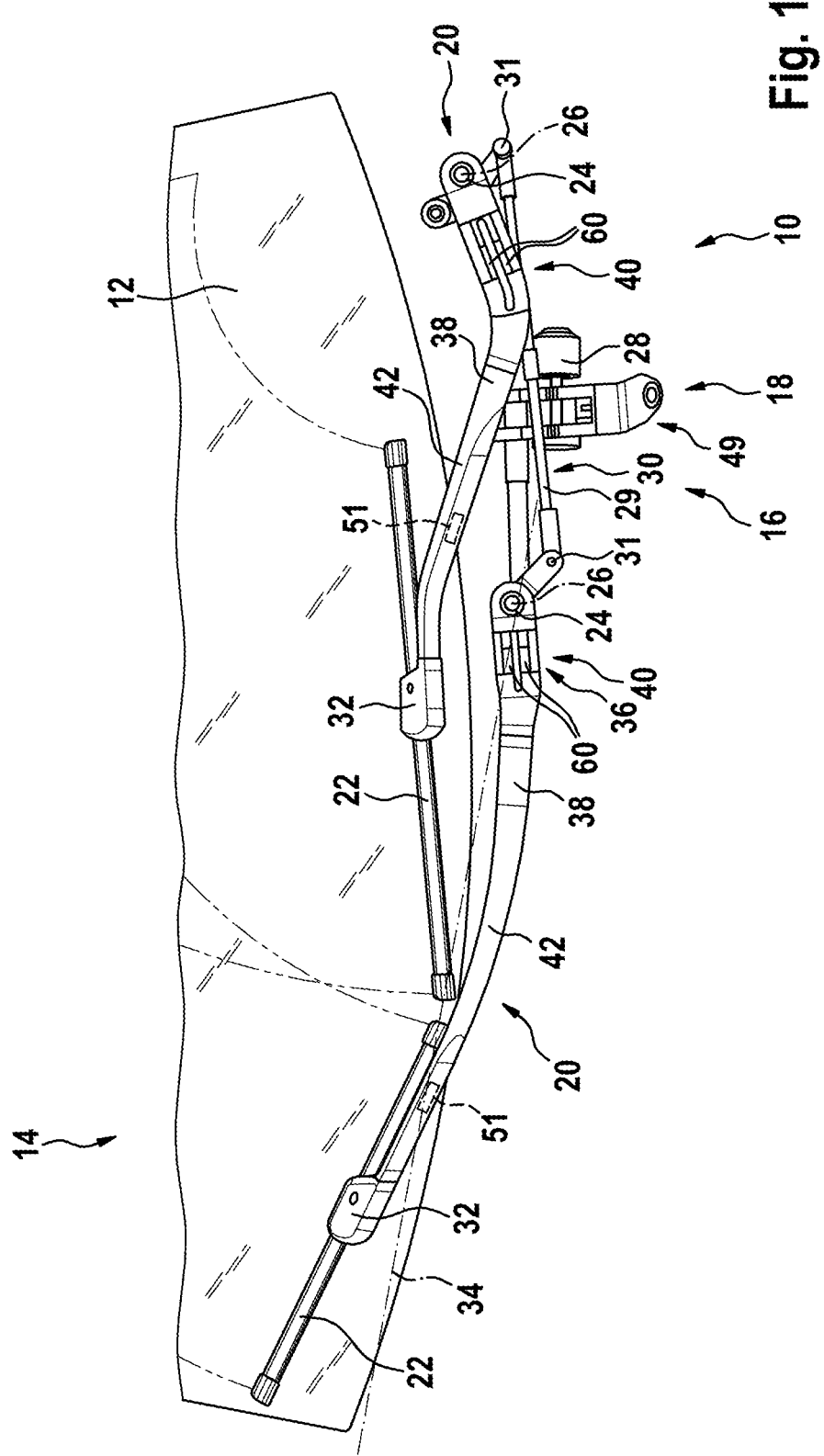
FIG. 1 shows a schematic illustration of a screen wiper system according to the invention on a screen of a vehicle, having two wiper arms according to the invention which comprise in each case one wiper arm device according to the invention.

A screen wiper system 10 which is disposed on a screen 12 of a vehicle 14 and is in particular provided for cleaning the screen 12 is shown in FIG. 1. Other design embodiments of the screen wiper system 10 and/or of the screen 12 are also conceivable, in particular also on screens of another type of object such as, for example, a building. The screen wiper system 10 comprises a wiper drive 16, a supply unit 18, two wiper arms 20, and two wiper blades 22. The wiper drive 16 is in particular at least largely disposed within a body of the vehicle 14 and/or is obscured by the body. The wiper drive 16 has two drive shafts 24 by way of which the wiper arms 20 are connected to the wiper drive 16. The wiper arms 20 by way of the drive shafts 24 are rotatably mounted and are in each case able to be driven about a drive axis 26 of one of the drive shafts 24. The wiper drive 16 preferably has at least one drive element 28 which is provided for driving the drive shafts 24 about the drive axis 26 thereof. The screen wiper system 10 has a coupling unit 30 which is provided for transmitting at least one movement from the drive element 28 to the drive shafts 24. The coupling unit 30 comprises an articulation rod 29 which by means of an eccentric movement transmits a rotating movement of the drive element 28 to the drive shafts 24 by way of a plurality of rotary joints 31. The wiper blades 22 are disposed on ends of the wiper arms 20 that face away from the drive shafts 24 and are connected to the wiper arms 20 in particular by way of a wiper arm adapter 32. The drive shafts 24 are preferably provided for moving in each case one of the wiper arms 20, in particular about one of the drive axes 26 of the drive shafts 24, relative to the wiper drive 16 and/or the screen 12. The drive shafts 24, in particular the drive axes 26, are configured so as to be at least substantially perpendicular to an axis of main extent 34 of one of the wiper arms 20 and/or the screen 12. The supply unit 18 comprises a fluid container and an electronics unit which in particular in FIG. 1 are not individually shown, and is provided for supplying the wiper blades 22 with a fluid and/or an electric voltage by way of a line unit 36 of the wiper arm 20.

The wiper arms 20 are preferably provided for connecting one of the wiper blades 22 of the screen wiper system 10 to the wiper drive 16, wherein the wiper drive 16 is in particular configured so as to be stationary relative to the screen 12. Each of the two wiper arms 20 comprises an articulation part 38, the line unit 36, and one wiper arm device 40. Each of the wiper arms 20 has a wiper rod 42 which is disposed on the articulation part 38. The wiper arm 20 comprises the wiper arm adapter 32 which is provided for fastening the wiper arm 20, in particular the wiper rod 42, to the wiper blade 22, in particular a wiper blade adapter of the wiper blade 22. The wiper blade 22, at least in a state disposed on the wiper arm 20, is mounted so as to be movable, in particular rotatable, on the wiper arm 20.

Each of the two wiper arm devices 40 comprises one fastening part 44 which is provided for connecting at least the articulation part 38 of the wiper arm 20 to one of the drive shafts 24 of the wiper drive 16, wherein the fastening part 44 has a fastening boss 46 for fastening the fastening part 44 on one of the drive shafts 24 and an articulation boss 48 for fastening the articulation part 38 on the fastening part 44. The wiper rod 42 is disposed on an end of the articulation part 38 that faces away from the fastening part 44 and is in particular connected in a force-fitting and form-fitting manner to the articulation part 38. The fastening part 44, in particular along an axis of main extent 50 of the fastening part 44, has a line receptacle 52 which is provided for at least partially receiving the line unit 36 of the wiper arm 20. One of the wiper arms 20 by way of the fastening part 44, in particular the fastening boss 46, is mounted so as to be rotatable on the drive shaft 24. The screen wiper system 10 has a heating unit 49 which is provided for heating at least one line element 60 of the line unit 36 of the two wiper arms 20. The heating unit 49 is provided for at least substantially preventing the fluid guided through the line elements 60 from freezing. The line elements 60 are guided through the wiper arms 20, in particular the fastening parts 44 of the wiper arm devices 40, to the wiper blade 22. The heating unit 49 has two heating elements 51 which are in each case disposed on a line element 60. The heating elements 51 are in each case disposed in one of the two wiper arms 20. However, other design embodiments of the wiper arm device 40, of the wiper arm 20, and/or of the screen wiper system 10 are also conceivable.

Figure 2:
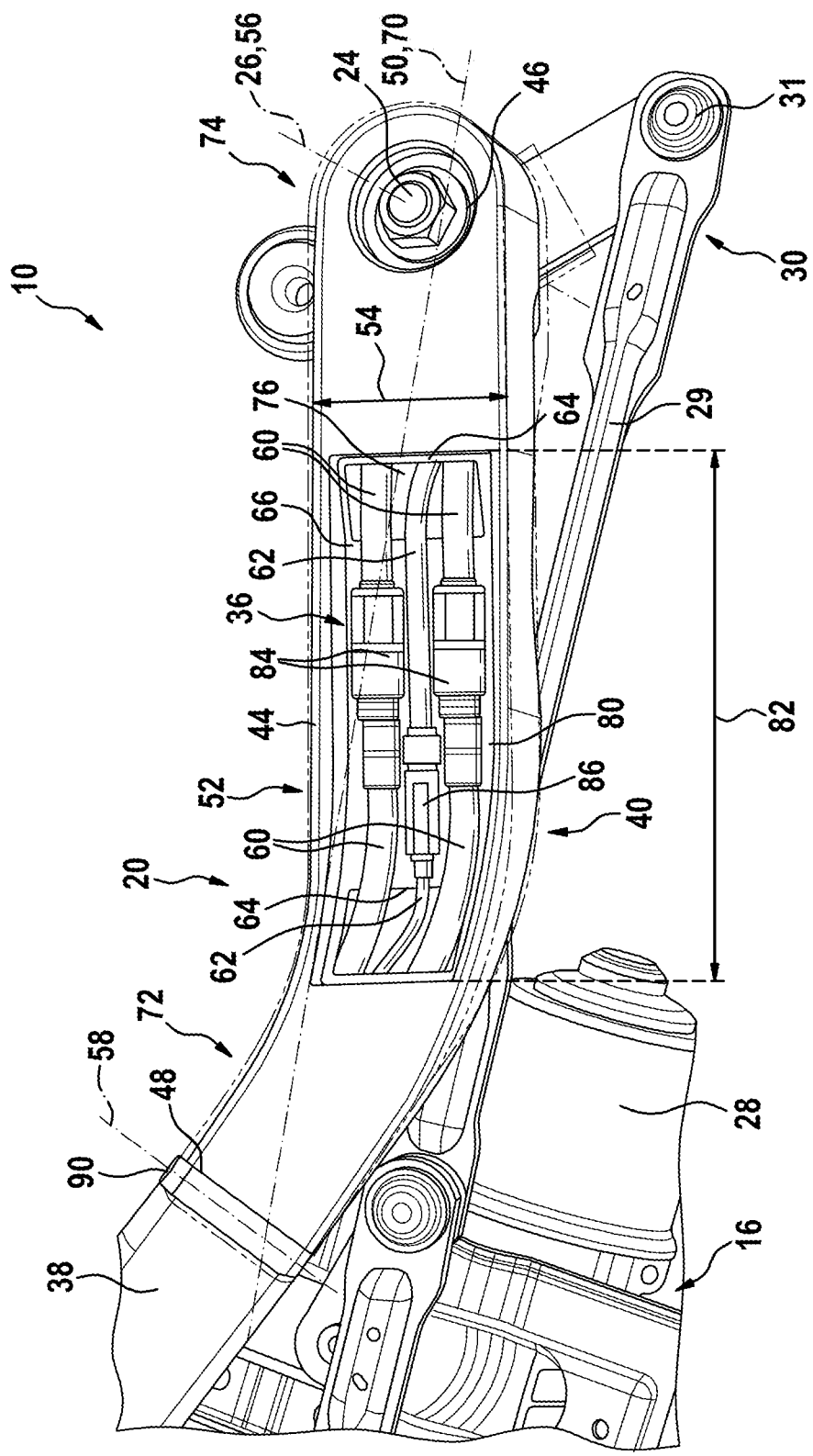
FIG. 2 shows a schematic illustration of a detailed view of the screen wiper system according to the invention in a region of one of the wiper arm devices according to the invention, in a plan view.

FIG. 2 shows a detailed view of the screen wiper system 10 in a region of the wiper arm device 40. The fastening boss 46 and the articulation boss 48 extend in each case so as to be at least substantially perpendicular to the axis of main extent 50 of the fastening part 44. The axis of main extent 50 of the fastening part 44 is configured so as to be at least substantially perpendicular to the drive axis 26 of the drive shaft 24. The fastening boss 46 and the articulation boss 48 have in each case one central axis 56, 58. The central axes 56, 58 of the fastening boss 46 and of the articulation boss 48 are preferably in each case aligned so as to be at least substantially perpendicular to the axis of main extent 50 of the fastening part 44. The central axes 56, 58 of the fastening boss 46 and of the articulation boss 48 are aligned so as to be at least substantially mutually perpendicular. The axis of main extent 50 of the fastening part 44 is configured so as to be at least substantially parallel with an axis of main extent 34 of the wiper arm 20, said axis of main extent 34 however not being shown in FIG. 2. The drive shaft 24 is in particular connected to the fastening part 44 by way of a threaded nut, in particular by way of the fastening boss 46. The central axis 56 of the fastening boss 46 is configured so as to be identical to the drive axis 26.

The line unit 36 is preferably disposed so as to be at least partially on and in the line receptacle 52. The line unit 36 is preferably provided for directing a fluid, in particular water and/or a cleaning agent, and electric and/or electronic signals from the supply unit 18 of the screen wiper system 10 to the wiper blade 22. The line unit 36 comprises six line elements 60, 62, wherein four of the line element 60 are configured as a hose, and two of the line elements 62 are configured as a cable. The two line elements 62 configured as a cable are provided for supplying one of the two heating elements 51 in the wiper arm 20 with voltage, in particular by means of the supply unit 18. The line receptacle 52 in a movement of the fastening part 44 about the drive axis 26 is preferably provided for holding the line unit 36, in particular the line elements 60, 62 on the fastening part 44. The line unit 36, in particular the line elements 60, 62 are partially enclosed by the line receptacle 52. The line receptacle 52 is provided for connecting, in particular in a force-fitting and/or form-fitting manner, the line unit 36, preferably the line elements 60, 62, to the fastening part 44 and for enabling an at least partial disposal of the line unit 36 within the fastening part 44. The line receptacle 52 has two force-fit and/or form-fit elements 64 and delimits a clearance 66 on the fastening part 44. The line receptacle 52 delimiting the clearance 66 in a plane that extends so as to be at least substantially perpendicular to the axis of main extent 50 of the fastening part 44 is configured so as to be at least largely U-shaped. The line unit 36, in particular the line elements 60, 62 are at least partially disposed within the clearance 66. The two force-fit and/or form-fit elements 64 are provided for at least partially connecting in a force-fitting and/or form-fitting manner the line unit 36 to the fastening part 44. The line receptacle 52, when viewed at least substantially perpendicularly to the axis of main extent 50 of the fastening part 44, is disposed within the fastening part 44. The line receptacle 52 delimiting the clearance 66, in particular the force-fit and/or form-fit elements 64, when viewed in a plane that extends so as to be at least substantially perpendicular to the axis of main extent 50 of the fastening part 44, are at least largely enclosed by an external contour of the fastening part 44. The line receptacle 52 delimiting the clearance 66 along the axis of main extent 50 of the fastening part 44 extends at least largely across an entire length of the fastening part 44. The line receptacle 52 and the fastening part 44 are configured in such a manner that the axis of main extent 50 of the fastening part 44 is aligned so as to be at least substantially parallel, in particular identical, with an axis of main extent 70 of the line receptacle 52, said axis of main extent 70 however not being illustrated in FIG. 2. The two force-fit and/or form-fit elements 64, when viewed along the axis of main extent 50 of the fastening part 44, are disposed behind one another within the clearance 66 on the fastening part 44, and are in particular integrally connected to the fastening part 44. The two force-fit and/or form-fit elements 64 are disposed on an internal side of the fastening part 44 on the fastening part 44, and are provided for at least partially holding the line unit 36, in particular the line elements 60, 62, on the fastening part 44. The internal side of the fastening part 44 on which the force-fit and/or form-fit elements 64 are disposed, is part of the line receptacle 52 and delimits the clearance 66 in which the line unit 36 is able to be disposed. The force-fit and/or form-fit elements 64 for holding the line unit 36 on the fastening part 44 are provided for partially connecting in a force-fitting and/or form-fitting manner the line elements 60, 62 to the fastening part 44. The force-fit and/or form-fit elements 64 are provided for at least partially reducing, in particularly constricting, a transverse extent of the clearance 66 delimited by the line receptacle 52 in comparison to a maximum transverse extent of the clearance 66, said transverse extent being aligned so as to be at least substantially perpendicular to the axis of main extent 50 of the fastening part 44, wherein the line elements 60, 62 on account of the flexural stiffness thereof are in particular connected in a force-fitting and/or form-fitting manner to the fastening part 44.

The line receptacle 52 is provided for guiding the line unit 36, in particular the line elements 60, 62, in a state disposed on the line receptacle 52, in particular when viewed along the axis of main extent 50 of the fastening part 44, at least from an end region 72 of the fastening part 44 that comprises the articulation boss 48 to an end region 74 of the fastening part 44 that comprises the fastening boss 46, wherein the line unit 36, in particular the line elements 60, 62 are enclosed by the line receptacle 52 and/or the fastening part 44 on at least two sides. The end region 72 of the fastening part 44 that comprises the articulation boss 48 extends from a side of the fastening part 44 that is disposed so as to be at least substantially perpendicular to the axis of main extent 50 of the fastening part 44 along the axis of main extent 50 of the fastening part 44 beyond the articulation boss 48. The end region 72 of the fastening part 44 that comprises the articulation boss 48, and the end region 74 of the fastening part 44 that comprises the fastening boss 46, along the axis of main extent 50 of the fastening part 44 are in each case configured across a proportion of an entire length of the fastening part 44 of at most 30%. The line receptacle 52 preferably has two conduit openings 76 which are provided for guiding the line unit 36, in particular line elements 60, 62 of the line unit 36, into or out of the line receptacle 52 and the fastening part 44. The conduit openings 76, when viewed along the axis of main extent 50 of the fastening part 44, are disposed in a region of the fastening part 44 between the articulation boss 48 and the fastening boss 46. One of the conduit openings 76 is disposed in the end region 72 of the fastening part 44 that comprises the articulation boss 48. One conduit opening 78 of the conduit openings 76 is disposed in the end region 74 of the fastening part 44 that comprises the fastening boss 46. The line unit 36, in particular the line elements 60, 62, in a manner transverse to the axis of main extent 50 of the fastening part 44, in a region of the fastening part 44 that is configured between the conduit openings 76, is/are preferably enclosed on three sides by the fastening part 44. The fastening part 44 along the axis of main extent 50 thereof, in particular in the end region 72 that comprises the articulation boss 48, has a curved basic shape. One of the conduit openings 78 is provided for guiding the line unit 36, in particular three of the line elements 60, 62, out of the fastening part 44 in at least one direction that faces the fastening boss 46. The conduit opening 78 is disposed in the end region 74 that comprises the fastening boss 46. The conduit opening 78 is disposed on a side of the fastening part 44 that is aligned so as to be at least substantially perpendicular to the central axis 56 of the fastening boss 46. However, other design embodiments of the line receptacle 52 are also conceivable.

The fastening part 44 has a service opening 80 which is disposed on at least one side of the line receptacle 52. The service opening 80 is disposed on a side of the line receptacle 52 that is aligned so as to be at least substantially perpendicular to the central axis 56 of the fastening boss 46. The service opening 80 on one side of the fastening part 44 and on the line receptacle 52 extends along the axis of main extent 50 of the fastening part 44, at least from the end region 72 that comprises the articulation boss 48 up to the end region 74 that comprises the fastening boss 46. The service opening 80 extends at least largely along an entire length 82 of the service opening 80, at least largely across an entire transverse extent 54 of the fastening part 44 and/or of the line receptacle 52, in particular so as to be at least substantially perpendicular to the axis of main extent 50 of the fastening part 44. The service opening 80 is provided for rendering at least one line element 60, 62 of the line unit 36 that is disposed on or in the line receptacle 52 so as to be accessible to a user in particular for maintenance, for assembly, or disassembly of the wiper arm 20 and/or of the wiper arm device 40. The service opening 80 and the conduit opening 78 are disposed on mutually dissimilar sides of the fastening part 44 and/or of the line receptacle 52 that face away from one another. The service opening 80 and the conduit opening 78, when viewed along the drive axis 26 and/or the central axis 56 of the fastening boss 46, are disposed so as to be mutually offset. However, other design embodiments of the fastening part 44, in particular of the service opening 80, are also conceivable.

The line unit 36 for connecting in a releasable manner in each case two of the four line elements 60 has two connection elements 84, wherein the two connection elements 84 are disposed within the line receptacle 52 in a region of the service opening 80 of the fastening part 44. Each of the two connection elements 84 comprises at least two connector regions which are in particular not shown in FIG. 2 and which are provided for fastening in a releasable, and in particular form-fitting and/or force-fitting, manner in each case one of the line elements 60 to one of the connection elements 84. Each of the two connection elements 84 on the connector regions is configured so as to correspond to one end of one of the line elements 60. The two connection elements 84 are provided for connecting line elements 60 configured as fluid lines. The two connection elements 84 are configured as hose connections. It is conceivable that the line unit 36 comprises at least one sealing element which is in particular disposed on one of the connection elements 84 or between one of the connection elements 84 and at least one of the line elements 60. The connection elements 84, at least in an assembled state of the wiper arm 20, when viewed so as to be at least substantially perpendicular to the axis of main extent 50 of the fastening part 44, are disposed within the line receptacle 52 and the service opening 80. The line unit 36 has one further connection element 86 which is provided for electrically connecting to one another the two line elements 62 configured as a cable. The further connection element 86 is configured as a plug connector. However, other design embodiments of the line unit 36 are also conceivable.

Figure 3:
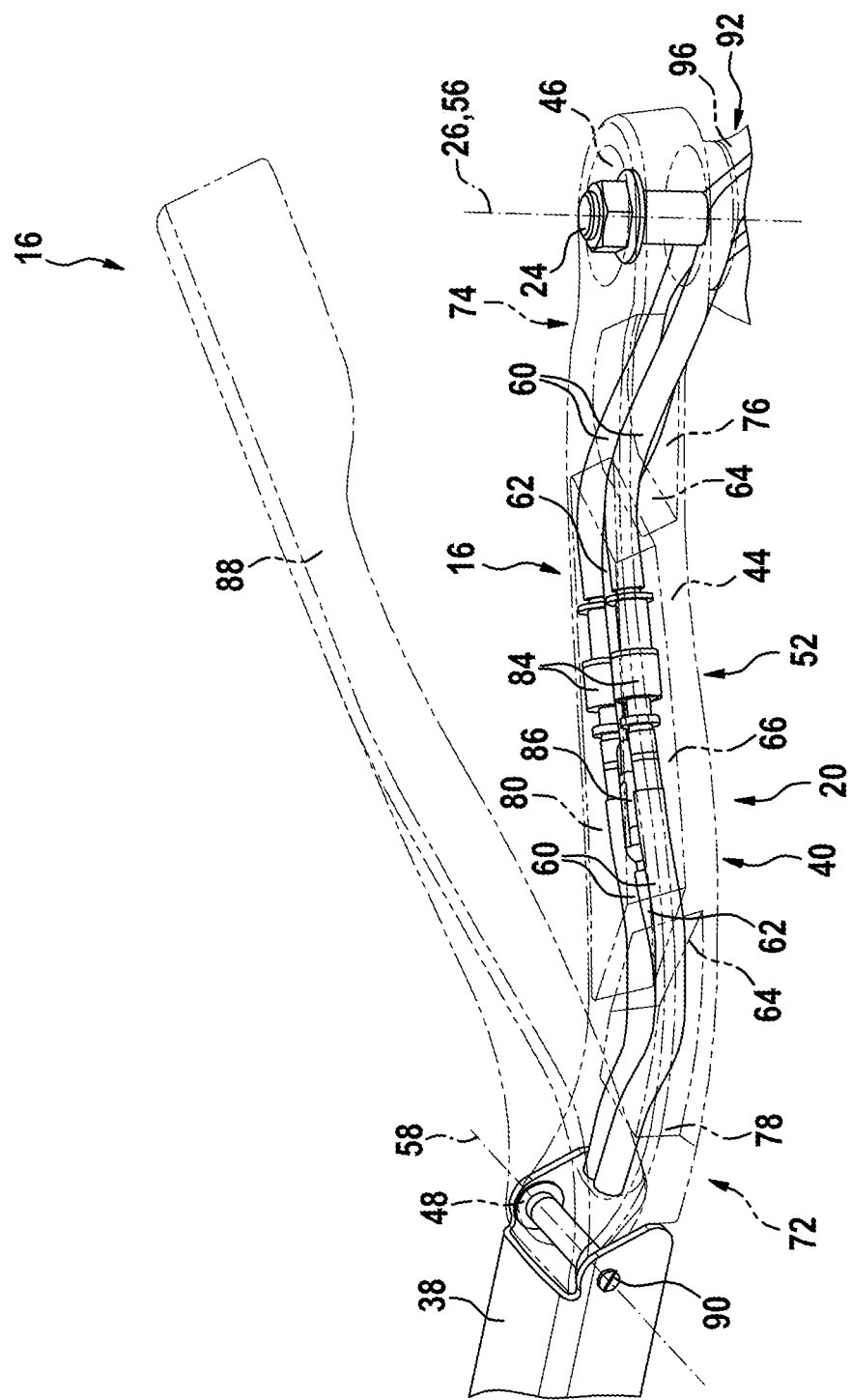
FIG. 3 shows a schematic illustration of a perspective view of the screen wiper system according to the invention in a region of the wiper arm device according to the invention, in an opened state of a cover cap of one of the wiper arms according to the invention.

A perspective view of the screen wiper system 10 in a region of the wiper arm device 40 is shown in FIG. 3. The wiper arm 20 comprises a cover cap 88 which, at least in a closed state, is provided for at least substantially completely covering at least the service opening 80 of the line receptacle 52. The cover cap 88 in FIG. 3 is shown in an at least partially opened state. The cover cap 88 by way of an articulation halt 90 mounted in the articulation boss 48 is mounted so as to be rotatable relative to the fastening part 44 and the articulation part 38. The cover cap 88 in the closed state at least largely encloses the fastening part 44. The cover cap 88 in the closed state at least partially bears on the fastening part 44, in particular in a region of the fastening boss 46. The cover cap 88 in the closed state, when viewed along the central axis 56 of the fastening boss 46, at least substantially completely encloses the fastening part 44. The cover cap 88 on at least one side of the fastening part 44 at least substantially completely covers the fastening boss 46. The cover cap 88 is at least largely configured from a hard plastics material. Three of the line elements 60, 62 are guided out of the fastening part 44, in particular through one of the conduit openings 76, in the direction of the articulation part 38 in a manner at least substantially perpendicular to the central axis 58 of the articulation boss 48. However, other design embodiments of the cover cap 88 are also conceivable.

Figure 4:
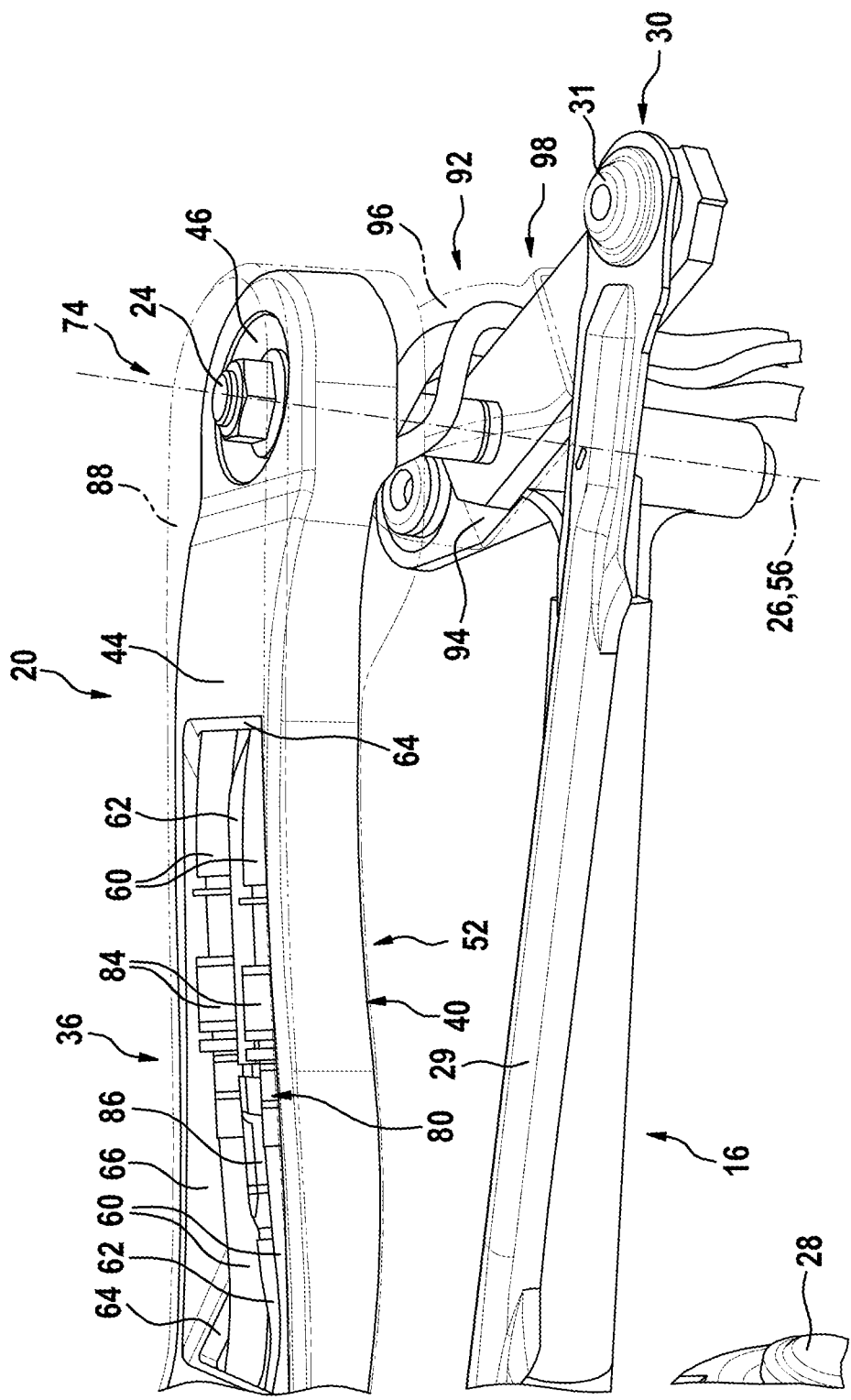
FIG. 4 shows a schematic illustration of a perspective view of the screen wiper system according to the invention in a region of the wiper arm device according to the invention and of a drive shaft of a wiper drive.

A perspective view of the screen wiper system 10 in a region of the wiper arm device 40 and the drive shaft 24 is shown in FIG. 4. The cover cap 88 is shown in the closed state in FIG. 4. The cover cap 88 in FIG. 4 is in particular illustrated in an indicative manner. The screen wiper system 10 has a bearing and/or guiding unit 92 which in a movement of the fastening part 44 about the central axis 56 of the fastening boss 46 is provided for mounting line elements 60, 62 of the line unit 36 so as to be at least partially movable about the central axis 56, and/or, proceeding from the fastening part 44, for guiding the line elements 60, 62 of the line unit 36 at least partially along and/or about the drive shaft 24. The bearing and/or guiding unit 92 is disposed on the wiper drive 16, in particular the drive shaft 24. The bearing and/or guiding unit 92 has a bearing element 94 which is configured so as to be rotatable about the central axis 56 of the fastening boss 46 and the drive shaft 24. The bearing element 94 in a movement of the fastening part 44 about the central axis 56 of the fastening boss 46 is provided for mounting the line elements 60, 62 of the line unit 36 so as to be movable about the central axis 56. The bearing element 94, when viewed in a plane that extends so as to be at least substantially perpendicular to the drive axis 26, at least substantially completely encloses the drive shaft 24. The bearing element 94 is configured as a bearing plate. The bearing and/or guiding unit 92 comprises a guiding element 96 which, proceeding from the fastening part 44, is provided for guiding the line elements 60, 62 of the line unit 36 partially along and about the drive shaft 24. The guiding element 96 is configured as a molded component which at least substantially completely encloses the drive shaft 24 at least partially along the drive axis 26. The guiding element 96 is configured in such a manner that at least one region of the guiding element 96 is configured so as to correspond to the line elements 60, 62 which are in particular guided by the guiding element 96 along the drive shaft 24. Alternatively or additionally, it is conceivable that the guiding element 96 is configured in such a manner that a connection region 98 of the drive shaft 24 is at least substantially completely covered. It is conceivable that the bearing and/or guiding unit 92 comprises a holding element which is provided for holding, in particular in a force-fitting and/or form-fitting manner, the line elements 60, 62 on the bearing element 94 and/or the guiding element 96, wherein no holding element is in particular shown in FIG. 4. However, other design embodiments of the bearing and/or guiding unit 92, in particular of the bearing element 94 and/or of the guiding element 96, are also conceivable.

Figure 5:
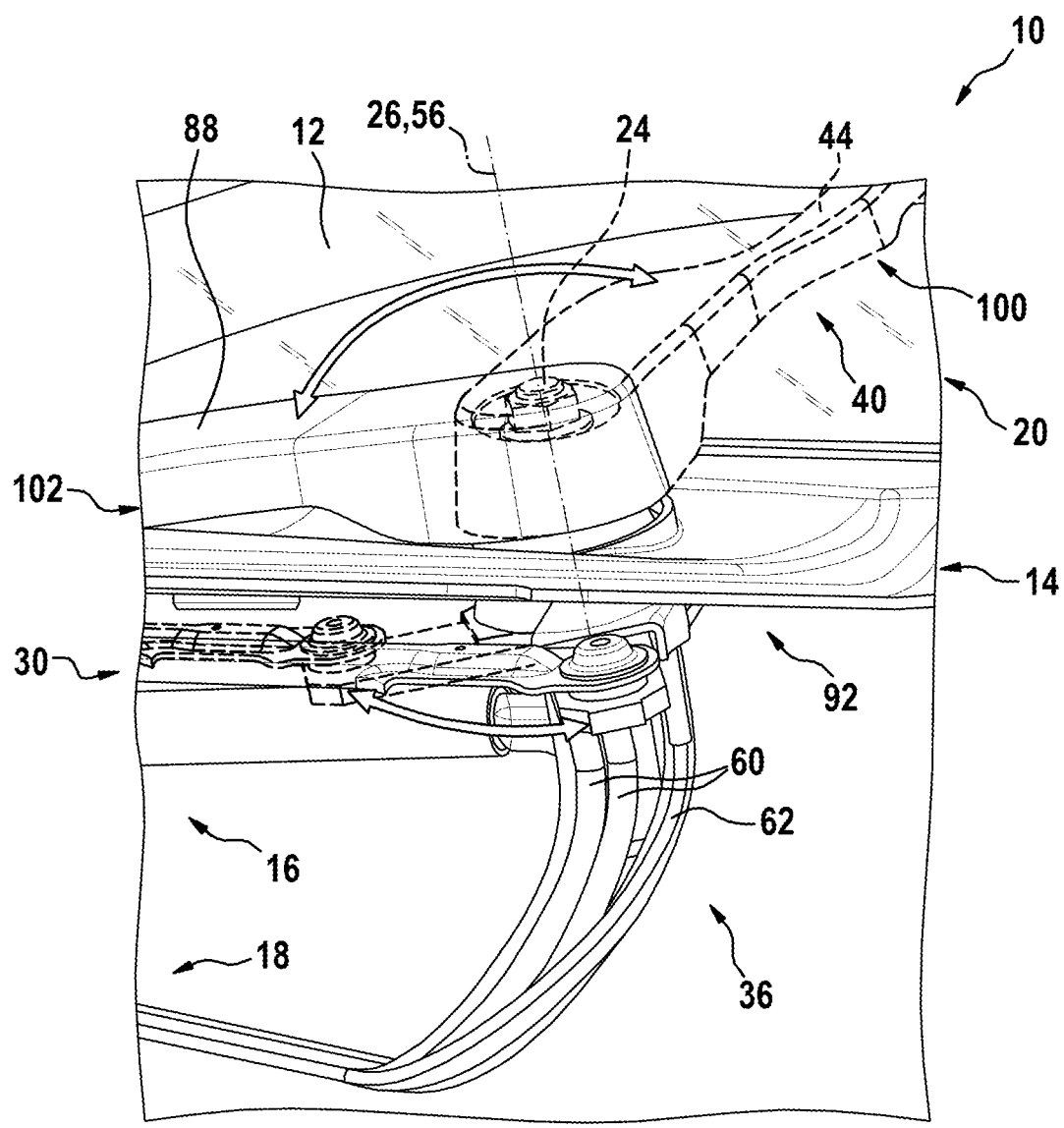
FIG. 5 shows a schematic illustration of a perspective view of the screen wiper system according to the invention in a region below the wiper arm device according to the invention.

A perspective view of the screen wiper system 10 in a region of the drive shaft 24 for two different positions 100, 102 of one of the wiper arms 20 during a movement about one of the drive axes 26 is shown in FIG. 5. The line elements 60, 62 of the line unit 36 conjointly with the fastening part 44 move about the drive axis 26 and are mounted and guided about the drive shaft 24 by way of the bearing and/or guiding unit 92. The line elements 60, 62 are in particular loosely guided along the drive axis 26, below the bearing and/or guiding unit 92, wherein twisting of the line elements 60, 62 on account of mutual movements of the line elements 60, 62 and/or relative to the wiper drive 16 can in particular be compensated for. The line elements 60, 62 are gathered on a lower side of the wiper drive 16 and connected to the supply unit 18 which is not shown in FIG. 5.

The invention claimed is:

1. A wiper arm device for a wiper arm (20), the wiper arm device comprising at least one fastening part (44) which is configured to connect at least one articulation part (38) of the wiper arm (20) to a drive shaft (24) of a wiper drive (16), wherein the fastening part (44) has at least one fastening boss (46) for fastening the fastening part (44) to the drive shaft (24) and at least one articulation boss (48) for fastening the articulation part (38) to the fastening part (44), characterized in that the fastening part (44) has at least one line receptacle (52), wherein the wiper arm device includes a line unit (36) disposed within the line receptacle (52), wherein the line receptacle (52) includes a first force-fit or form-fit element (64) which is disposed within an interior of the fastening part (44) and is configured to at least partially fix or hold the line unit (36) on the fastening part (44), wherein the line receptacle (52) includes a second force-fit or form-fit element (64) which is disposed within an interior of the fastening part (44) and is configured to at least partially fix or hold the line unit (36) on the fastening part, wherein the line unit (36) includes two line elements (60, 62), and has a connection element (84, 86) for connecting in a releasable manner the two line elements (60, 62), wherein the connection element (84, 86) is disposed in the line receptacle (52) and is a separate element from the first force-fit or form-fit element (64) and the second force-fit or form-fit element (64), wherein the connection element (84, 86) is disposed longitudinally between the first force-fit or form-fit element (64) and the second force-fit or form-fit element (64) along a longitudinal direction, wherein each of the first force-fit or form-fit element (64), the second force-fit or form-fit element (64), and the connection element (84, 86) is spaced longitudinally from the fastening boss (46), wherein the first force-fit or form-fit element (64) includes a first set of walls that extend at oblique angles relative to the longitudinal direction and define a first conduit opening (76) within the interior of the fastening part (44) for guiding the line conduit (36), and wherein the second force-fit or form-fit element (64) includes a second set of walls that extend at oblique angles relative to the longitudinal direction and define a second conduit opening (78) within the interior of the fastening part (44) for guiding the line conduit (36).

2. The wiper arm device according to claim 1, characterized in that the line receptacle (52) is configured to guide the line unit (36) in a state disposed on the line receptacle (52) at least from an end region (72) of the fastening part (44) that comprises the articulation boss (48) to an end region (74) of the fastening part (44) that comprises the fastening boss (46), wherein the line unit (36) is enclosed by the fastening part (44) on at least two sides.

3. The wiper arm device according to claim 1, characterized in that the line receptacle (52) at least largely encloses the line unit (36), wherein the fastening part (44) has at least one service opening (80) which is disposed on at least one side of the line receptacle (52).

4. The wiper arm device according to claim 3, characterized in that the service opening (80) and the first and second conduit openings (76, 78) are disposed on mutually dissimilar sides of the fastening part (44).

5. The wiper arm device according to claim 3, characterized in that the service opening (80) and the first and second conduit openings (76, 78) are disposed on mutually dissimilar sides of the fastening part (44), wherein the dissimilar sides face away from one another.

6. A wiper arm comprising
at least one articulation part (38),
at least one line unit (36), and
the wiper arm device according to claim 1,
wherein the articulation boss (48) defines an axis (58),
wherein the fastening part (44) has at least one service opening (80) which is disposed on at least one side of the line receptacle (52); and
wherein the wiper arm device includes a cover cap (88) which at least in a closed state is configured to completely cover the service opening (80) of the line receptacle (52), wherein the cover cap (88) is pivotally coupled to the articulation boss (48) and is rotatable relative to the fastening part (44) about the axis (58).

7. A screen wiper system comprising
at least one wiper blade (22),
at least one wiper drive (16), at least one wiper arm (20) comprising
   at least one articulation part (38),
   at least one line unit (36), and
   the wiper arm device according to claim 1, wherein the articulation boss (48) defines an axis (58), wherein the fastening part (44) has at least one service opening (80) which is disposed on at least one side of the line receptacle (52);

at least one supply unit (18) which by way of the line unit (36) of the wiper arm (20) is configured to supply the wiper blade (22) with at least one of a fluid or an electric voltage; and a cover cap (88) which at least in a closed state is configured to completely cover the service opening (80) of the line receptacle (52), wherein the cover cap (88) is pivotally coupled to the articulation boss (48) and is rotatable relative to the fastening part (44) about the axis (58).

8. The screen wiper system according to claim 7, wherein the at least one supply unit (18) is at least one of a fluid container or an electronics unit.

9. The screen wiper system according to claim 7, further comprising at least one bearing or guiding unit (92) which in a movement of the fastening part (44) about a central axis (56) of the fastening boss (46) is configured to bear the line unit (36) so as to be at least partially movable about the central axis (56).

10. The screen wiper system according to claim 9, wherein the least one bearing or guiding unit (92) is configured to guide the line unit (36) at least partially along or about the drive shaft (24), proceeding from the fastening part (44).

11. The screen wiper system according to claim 7, wherein the at least one supply unit (18), by way of the line unit (36) of the wiper arm (20), is configured to supply the wiper blade (22) with at least one of a fluid or an electric voltage.

12. The wiper arm device according to claim 1, wherein the fastening part (44) has the at least one line receptacle (52) along an axis of main extent (50) of the fastening part (44).

* * * * *